(12) United States Patent
Dong et al.

(10) Patent No.: US 11,912,097 B2
(45) Date of Patent: Feb. 27, 2024

(54) ALL-TERRAIN VEHICLE

(71) Applicant: SEGWAY TECHNOLOGY CO., LTD., Changzhou (CN)

(72) Inventors: Zhen Dong, Changzhou (CN); Mingtang Chen, Changzhou (CN); Weigang Que, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 122 days.

(21) Appl. No.: 17/576,462

(22) Filed: Jan. 14, 2022

(65) Prior Publication Data
US 2022/0227191 A1    Jul. 21, 2022

(30) Foreign Application Priority Data

Jan. 15, 2021 (CN) .......................... 202120122593.4
Jan. 15, 2021 (CN) .......................... 202120124247.X

(51) Int. Cl.
*B60G 3/20* (2006.01)
*B62D 21/18* (2006.01)

(52) U.S. Cl.
CPC .......... *B60G 3/202* (2013.01); *B62D 21/183* (2013.01); *B60G 2200/1442* (2013.01); *B60G 2200/182* (2013.01); *B60G 2204/148* (2013.01); *B60G 2300/07* (2013.01)

(58) Field of Classification Search
CPC ............ B60G 3/202; B60G 2200/1442; B60G 2200/182; B60G 2204/148; B60G 2300/07; B62D 21/183; B62D 7/16
See application file for complete search history.

(56) References Cited

U.S. PATENT DOCUMENTS

| 10,226,977 | B2 * | 3/2019 | Coppuck | B60G 3/202 |
| 2012/0031688 | A1 * | 2/2012 | Safranski | B60G 3/20 |
| | | | | 280/124.135 |
| 2015/0251510 | A1 * | 9/2015 | Murray | B60G 7/001 |
| | | | | 280/124.148 |
| 2019/0291521 | A1 * | 9/2019 | Sawai | B60G 7/005 |
| 2019/0367086 | A1 * | 12/2019 | De Grammont | B60G 7/001 |
| 2021/0031580 | A1 * | 2/2021 | Booth | B60G 3/26 |

* cited by examiner

*Primary Examiner* — Jason D Shanske
*Assistant Examiner* — Matthew James O'Neill
(74) *Attorney, Agent, or Firm* — Emerson, Thomson & Bennett, LLC; Roger D. Emerson; Matt J. Wilson

(57) ABSTRACT

The present disclosure discloses an all-terrain vehicle including a frame; a trailing arm, an upper tie rod and a lower tie rod. A front end of the trailing arm is connected to the frame. An inner end of the upper tie rod is connected to the frame and an outer end of the upper tie rod is mounted at a rear end of the trailing arm. An inner end of the lower tie rod is connected to the frame and an outer end of the upper tie rod is mounted at the rear end of the trailing arm. The lower tie rod is located below the upper tie rod. An included angle between the upper tie rod and the lower tie rod being a, and a satisfies a relationship: 0°<a<5°.

18 Claims, 10 Drawing Sheets

ALL-TERRAIN VEHICLE

CROSS-REFERENCE TO RELATED APPLICATION

The present application claims the priority of Chinese patent applications 202120124247.X, filed on Jan. 15, 2021, and entitled "All-Terrain Vehicle" and 202120122593.4, filed on Jan. 15, 2021, and entitled "All-Terrain Vehicle", the complete disclosure of which are expressly incorporated by reference herein.

TECHNICAL FIELD

The present disclosure relates to the technical field of all-terrain vehicles, and more particularly, to an all-terrain vehicle.

BACKGROUND

With the development of science and technology and the improvement of people's living standards, all-terrain vehicles have been recognized by users and gradually come into the public eye by their advantages that they are not restricted by road conditions and can still be driven normally on severe road conditions including bumpy and soft road conditions. The all-terrain vehicle adjusts toes of wheels through an upper tie rod and a lower tie rod spaced in the vertical direction, so that the all-terrain vehicle can run smoothly.

SUMMARY

The present disclosure aims to solve at least one of the technical problems in the prior art. Therefore, the present disclosure proposes an all-terrain vehicle, which has good stability and ride comfort.

An all-terrain vehicle provided according to some embodiments of the present disclosure includes: a frame; a trailing arm, a front end of the trailing arm being connected to the frame; an upper tie rod, an inner end of the upper tie rod being connected to the frame and an outer end of the upper tie rod being mounted at a rear end of the trailing arm; and a lower tie rod, an inner end of the lower tie rod being connected to the frame and an outer end being mounted at the rear end of the trailing arm, the lower tie rod being located below the upper tie rod, an included angle between the upper tie rod and the lower tie rod being a, and a satisfying a relationship: $0° < a < 5°$.

Since there is an included angle a between the upper tie rod and the lower tie rod, and the angle a satisfies the relationship: $0° < a < 5°$, camber angles of wheels can be automatically changed when the wheels move up and down, the change of the wheel span and the wear of the wheels can be reduced, and the wheels can also cling to the ground well, which can improve the stability of the all-terrain vehicle.

In some examples of the present disclosure, an included between the upper tie rod and the horizontal plane is b, an included between the lower tie rod and the horizontal plane is c, and b and c satisfy a relationship: $b < c$.

In some examples of the present disclosure, b and c respectively satisfy relationships: $0° < b \leq 28°$, $0° < c \leq 30°$.

In some examples of the present disclosure, a satisfies a relationship: $0° < a < 3°$.

In some examples of the present disclosure, the all-terrain vehicle further includes: an axle support and a control rod, the axle support being connected to the rear end of the trailing arm, an inner end of the control rod being connected to the frame and an outer end being connected to the axle support, and the control rod being located between the upper tie rod and the lower tie rod.

In some examples of the present disclosure, the control rod has an included angle with the upper tie rod and an included angle with the lower tie rod.

In some examples of the present disclosure, the included angle between the control rod and the lower tie rod is d, and d satisfies a relationship: $0° < d < 5°$.

In some examples of the present disclosure, the length of the control rod is greater than a length of the upper tie rod and greater than a length of the lower tie rod.

In some examples of the present disclosure, the outer end of the control rod is outward beyond a line connecting the outer end of the upper tie rod and the outer end of the lower tie rod; and/or the inner end of the control rod is inward beyond a line connecting the inner end of the upper tie rod and the inner end of the lower tie rod.

In some examples of the present disclosure, the outer end of the control rod is located on the rear side of the line connecting the outer end of the upper tie rod and the outer end of the lower tie rod. Some of the additional aspects and advantages of the present disclosure will be provided in the following description, and some will become apparent from the following description, or be learned by practice of the present disclosure.

One or more embodiments of the present disclosure propose an all-terrain vehicle, which is provided with an upper tie rod and a lower tie rod, so that the rear wheel suspension has a large travel.

An all-terrain vehicle according to one or more embodiments of the present disclosure includes: a frame; a trailing arm, a front end of the trailing arm being connected to the frame; an axle support, the axle support having an upper mounting end and a lower mounting end, and the upper mounting end and the lower mounting end being spaced in the vertical direction and connected to a rear end of the trailing arm; an upper tie rod, an inner end of the upper tie rod being connected to the frame and an outer end of the upper tie rod being mounted at the rear end of the trailing arm; and a lower tie rod, an inner end of the lower tie rod being connected to the frame and an outer end of the lower tie rod being mounted at the rear end of the trailing arm, and the lower tie rod being located below the upper tie rod, wherein a mounting axis of the upper mounting end at the rear end of the trailing arm and a mounting axis of the outer end of the upper tie rod at the rear end of the trailing arm are non-collinear, and/or a mounting axis of the lower mounting end at the rear end of the trailing arm and a mounting axis of the outer end of the lower tie rod at the rear end of the trailing arm are non-collinear.

Accordingly, the all-terrain vehicle of one or more embodiments of the present disclosure is provided with an upper tie rod and a lower tie rod, which can increase the demand for a larger wheel suspension travel, so as to improve the comfort performance of the rear suspension of the all-terrain vehicle.

According to some embodiments of the present disclosure, the mounting axis of the upper mounting end at the rear end of the trailing arm is located outside the mounting axis of the outer end of the upper tie rod at the rear end of the trailing arm in an inner-outer direction; and/or the mounting axis of the lower mounting end is located outside the mounting axis of the outer end of the lower tie rod in an outer-inner direction.

According to some embodiments of the present disclosure, the mounting axis of the upper mounting end is located above the mounting axis of the outer end of the upper tie rod in an up-down direction; and/or the mounting axis of the lower mounting end is located above the mounting axis of the outer end of the lower tie rod in the up-down direction.

According to some embodiments of the present disclosure, the outer end of the upper tie rod is located on the rear side of the upper mounting end in an front-rear direction; and/or the outer end of the lower tie rod is located on the rear side of the lower mounting end in the front-rear direction.

According to some embodiments of the present disclosure, the mounting axis of the upper mounting end and the mounting axis of the outer end of the upper tie rod are arranged in parallel; and/or the mounting axis of the lower mounting end and the mounting axis of the outer end of the lower tie rod are arranged in parallel.

According to some embodiments of the present disclosure, the axle support is correspondingly connected with an axle, a center line between the outer end of the upper tie rod and the outer end of the lower tie rod is a first straight line, and the first straight line is arranged in parallel to a rotation kingpin axis of the axle.

According to some embodiments of the present disclosure, the all-terrain vehicle further includes: a bracket assembly connected to the rear end of the trailing arm, the outer end of the upper tie rod and the outer end of the lower tie rod being respectively connected to the bracket assembly.

According to some embodiments of the present disclosure, the bracket assembly includes: a first upper bracket, a second upper bracket, a third upper bracket, a first lower bracket, a second lower bracket and a third lower bracket, wherein the first upper bracket and the first lower bracket are arranged oppositely in the vertical direction and connected to the rear end of the trailing arm, the second upper bracket is connected between the first upper bracket and the third upper bracket, the second lower bracket is connected between the first lower bracket and the third lower bracket, the upper mounting end of the axle support is arranged between the first upper bracket and the third upper bracket and the lower mounting end of the axle support is arranged between the first lower bracket and the third lower bracket, the outer end of the upper tie rod is arranged between the second upper bracket and the third upper bracket and the outer end of the lower tie rod is arranged between the second lower bracket and the third lower bracket.

According to some embodiments of the present disclosure, the third upper bracket includes: a first mounting plate, a second mounting plate and a first connecting plate, wherein the first connecting plate is connected to the second upper bracket, the first mounting plate is provided with a first mounting hole and corresponds to the upper mounting end, the second mounting plate is provided with a second mounting hole and corresponds to the outer end of the upper tie rod, the first mounting plate and the second mounting plate are misaligned with one arranged inside and the other arranged outside, and the axes of the first mounting hole and the second mounting hole are non-collinear; and/or the third lower bracket includes: a third mounting plate, a fourth mounting plate and a second connecting plate, wherein the second connecting plate is connected to the second lower bracket, the third mounting plate is provided with a third mounting hole and corresponds to the lower mounting end, the fourth mounting plate is provided with a fourth mounting hole and corresponds to the outer end of the lower tie rod, the third mounting plate and the fourth mounting plate are misaligned with one arranged inside and the other arranged outside, and the axes of the third mounting hole and the fourth mounting hole are non-collinear.

According to some embodiments of the present disclosure, the all-terrain vehicle further includes: a toe control rod, an outer end of the toe control rod being connected to the axle support and an inner end being connected to the frame, and the toe control rod being located between the upper tie rod and the lower tie rod.

According to some embodiments of the present disclosure, the rear end of the axle support is provided with a toe knuckle arm seat, and the outer end of the toe control rod is connected to the toe knuckle arm seat.

According to some embodiments of the present disclosure, the length of the toe control rod is greater than the length of the upper tie rod and greater than the length of the lower tie rod; the outer end of the toe control rod is outward beyond the line connecting the outer end of the upper tie rod and the outer end of the lower tie rod; and/or the inner end of the toe control rod is inward beyond the line connecting the inner end of the upper tie rod and the inner end of the lower tie rod.

According to some embodiments of the present disclosure, the all-terrain vehicle further includes: a fixed plate arranged on a rear side of the frame, the inner end of the toe control rod, the inner end of the upper tie rod and the inner end of the lower tie rod being arranged on the fixed plate.

According to some embodiments of the present disclosure, the all-terrain vehicle further includes a driving device, an axle shaft and a stabilizer bar, wherein the driving device is arranged on the frame, the axle shaft is in transmission fit with the driving device and an outer end extends toward the axle support; the stabilizer bar is arranged on the frame and the trailing arm and located on the upper front side of the axle shaft and on the front side of the driving device.

According to some embodiments of the present disclosure, the stabilizer bar includes: a main bar section and branch bar sections, the main bar section being arranged on the frame, the branch bar sections being connected to both sides of the main bar section and extending toward a rear direction, and rear end of each of the branch bar sections being coupled to an upper part of the trailing arm.

BRIEF DESCRIPTION OF THE DRAWINGS

The above and/or additional aspects and advantages of the present disclosure will become apparent and readily appreciated from the following descriptions about embodiments with reference to the drawings, in which.

REFERENCE NUMERALS

Figure 1:
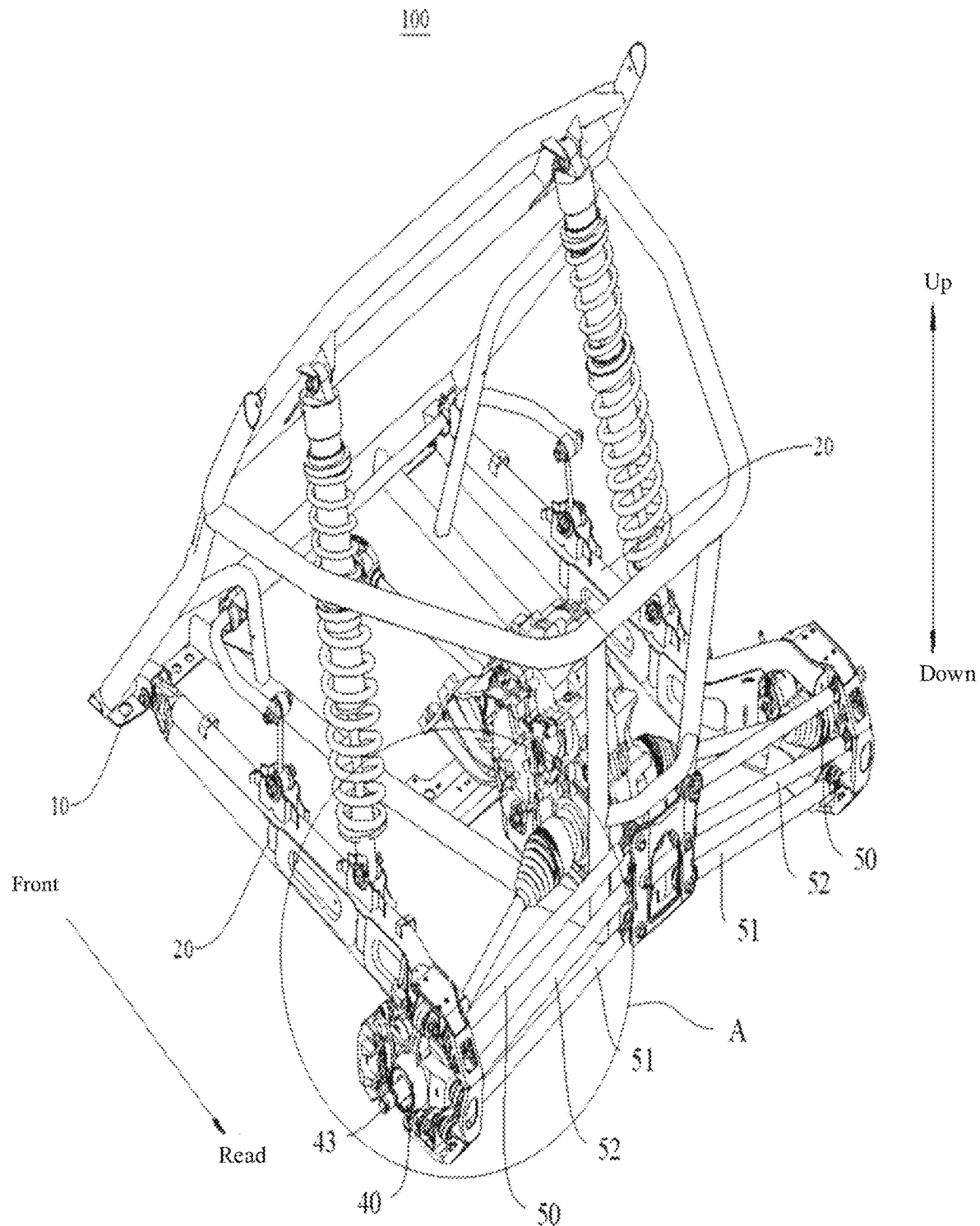
FIG. 1 is a perspective view of an all-terrain vehicle according to an embodiment of the present disclosure.

All-terrain vehicle 100;
Frame 10; trailing arm 20; upper tie rod 50; lower tie rod 51; control rod 52; axle support 40; axle 43; support 11; left mounting seat 12; right mounting seat 13; shock absorber 21; first mounting seat 22; second mounting seat 23; third mounting seat 24; bracket assembly 30; first upper bracket 31; second upper bracket 32; third upper bracket 33; first mounting plate 331; first mounting hole 3311; second mounting plate 332; second mounting hole 3321; first connecting plate 333; first lower bracket 34; second lower bracket 35; third lower bracket 36; third mounting plate 361; third mounting hole 3611; fourth mounting plate 362; fourth mounting hole 3621; second connecting plate 363; upper mounting end 41; lower mounting end 42; rear brake inlay 44; joint bearing 45; toe knuckle arm seat 46; hub bearing 47; fixed plate 60; driving device 70; rear transmission shaft 71; axle shaft 80; stabilizer bar 90; main bar section 91; support rod section 92; connecting rod section 93; bolt 200; nut 300; first straight line 400; rotation kingpin axis 500.

DETAILED DESCRIPTION

Embodiments of the present disclosure will be described in detail below, and the embodiments described with reference to the drawings are exemplary. The embodiments of the present disclosure are described in detail below.

An all-terrain vehicle 100 according to embodiments of the present disclosure is described below with reference to FIGS. 1-4.

Figure 3:
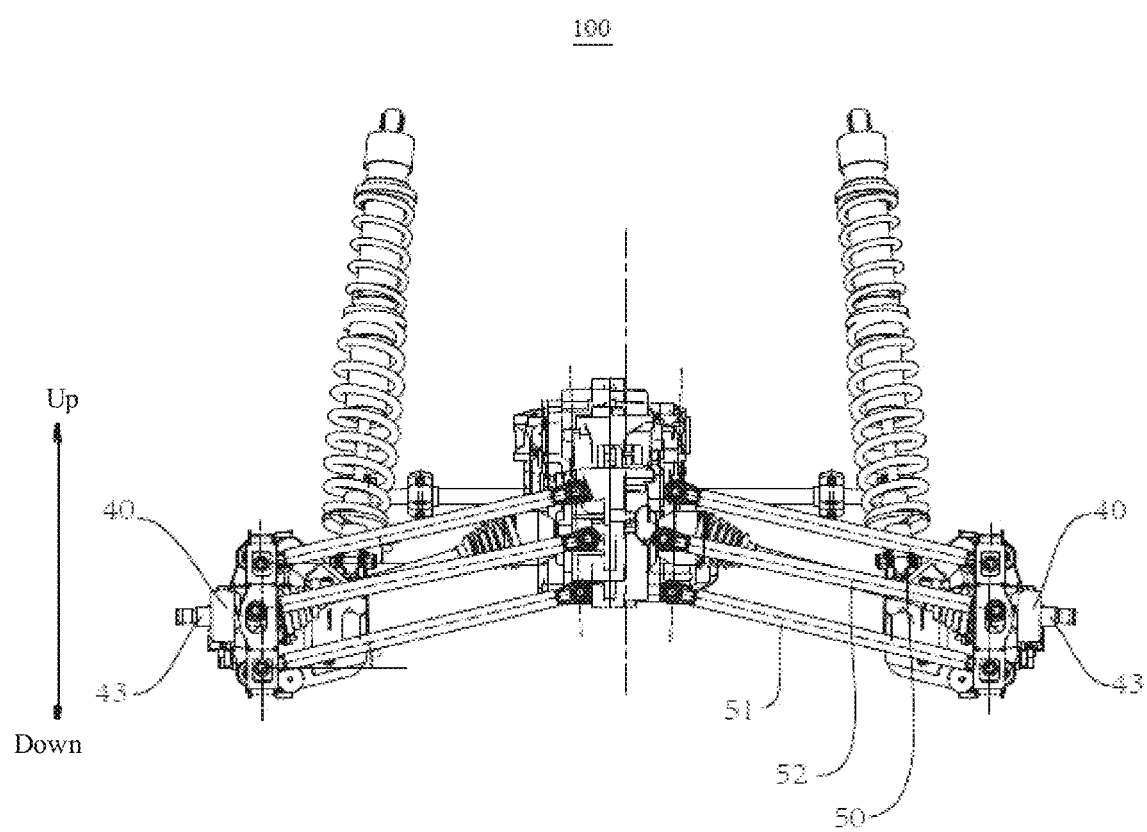
FIG. 3 is a rear view of the all-terrain vehicle according to an embodiment of the present disclosure.

As shown in FIG. 1 and FIG. 3, the all-terrain vehicle 100 according to the embodiments of the present disclosure may mainly include: a frame 10, a trailing arm 20, an upper tie rod 50 and a lower tie rod 51. A front end of the trailing arm 20 is connected and fixed to the frame 10, an inner end of the upper tie rod 50 is connected to the frame 10 and an outer end is mounted on a rear end of the trailing arm 20, an inner end of the lower tie rod 51 is connected to the frame 10 and an outer end is mounted on the rear end of the trailing arm 20, so that the upper tie rod 50 and the lower tie rod 51 can be stably and firmly mounted on the all-terrain vehicle 100. The upper tie rod 50 and the lower tie rod 51 can not only prevent the all-terrain vehicle 100 from turning and rolling, but also can improve the driving stability and ride comfort of the all-terrain vehicle 100.

Figure 2:
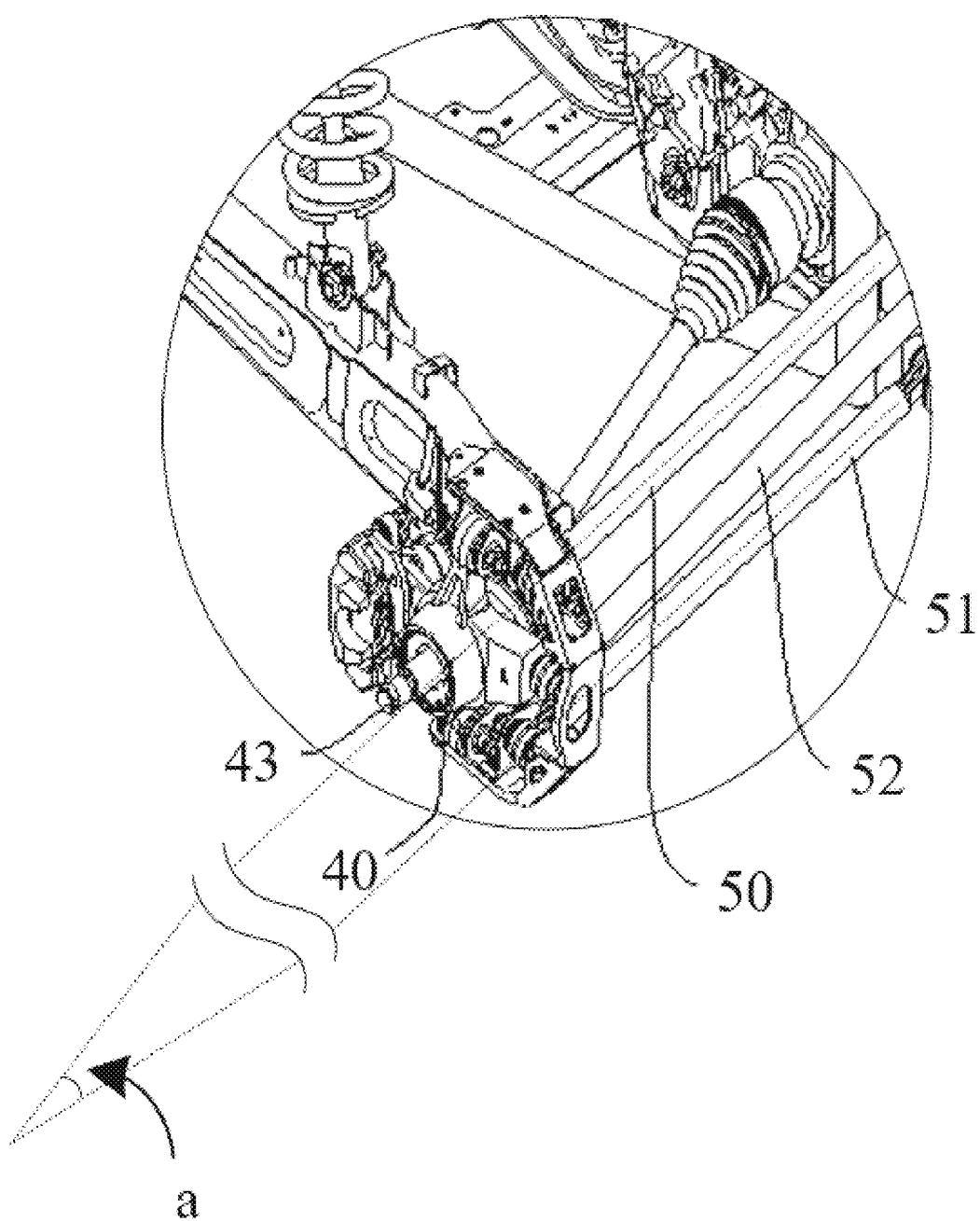
FIG. 2 is a partial enlarged view of part A in FIG. 1.

As shown in FIGS. 1, 2 and 3, the lower tie rod 51 is located below the upper tie rod 50, the included angle between the upper tie rod 50 and the lower tie rod 51 is a, and a satisfies the relationship: 0°<a<5°. Specifically, because the lower tie rod 51 should be longer than the upper tie rod 50, the lower tie rod 51 can be inclined relative to the upper tie rod 50 without changing the positions of the outer ends and inner ends of the upper tie rod 50 and the lower tie rod 51. The lower tie rod 51 has an included angle with respect to the upper tie rod 50, so that the upper tie rod 50 is stably and firmly mounted on the vehicle. In addition, not only can wheels automatically change their camber angles when moving up and down, but the change of the wheel span and the wear of the wheels can be reduced, and the wheels can also cling to the ground well, which can improve the stability of the all-terrain vehicle 100.

As shown in FIG. 3, the included angle between the upper tie rod 50 and the horizontal plane is b, the included angle between the lower tie rod 51 and the horizontal plane is c, and b and c satisfy the relationship: b<c. When the wheels of the terrain vehicle 100 move up and down, the upper tie rod 50 has a smaller movement radian than the lower tie rod 51, which will cause the wheels to move slightly inward and outward, but has a small impact on bottoms of the wheels, thereby effectively reducing the wear of the wheels and improving the ride comfort and direction stability of the vehicle.

As shown in FIG. 3, b and c respectively satisfy the relationships: 0°<b≤28°, 0°<c≤30°. Under the premise that the included angle b between the upper tie rod 50 and the horizontal plane is smaller than the included angle c between the lower tie rod 51 and the horizontal plane, the reasonable configuration of the included angle b between the upper tie rod 50 and the horizontal plane and the included angle c between the lower tie rod 51 and the horizontal plane can not only facilitate the installation of the upper tie rod 50 and the lower tie rod 51, but also enables the upper tie rod 50 and the lower tie rod 51 to automatically change the camber angle of the all-terrain vehicle 100 during travel, and can also absorb the lateral force borne by the wheels and reduce the inclination of the all-terrain vehicle 100 when the wheels turn.

As shown in FIG. 1 and FIG. 3, a satisfies the relationship: 0°<a<3°, which ensures an angle between the upper tie rod 50 and the lower tie rod 51, and further defines the range of the included angle between the upper tie rod 50 and the lower tie rod 51, thereby further improving the performance of the upper tie rod 50 and the lower tie rod 51 and further improving the reliability of the upper tie rod 50 and the lower tie rod 51.

As shown in FIGS. 1-4, the all-terrain vehicle 100 may further mainly include: an axle support 40 and a control rod 52. The axle support 40 is connected to the rear end of the trailing arm 20, an inner end of the control rod 52 is connected to the frame 10 and an outer end is connected to the axle support 40, and the control rod 52 is located between the upper tie rod 50 and the lower tie rod 51. Specifically, the control rod 52 is arranged between the upper tie rod 50 and the lower tie rod 51, and the control rod 52, the upper tie rod 50 and the lower tie rod 51 can jointly control or adjust the wheels, so that positioning parameters for the wheels can be adjusted more effectively, the wheels can obtain a larger travel, and the motion trajectory of the wheel can be controlled more effectively. In addition, an axle 43 is arranged on the axle support 40 to connect the wheels.

As shown in FIG. 1 and FIG. 3, the control rod 52 has an included angle with the upper tie rod 50 and an included angle with the lower tie rod 51. Specifically, the control rod 52 is arranged at angles with the upper tie rod 50 and the lower tie rod 51, which can further reduce the change of the wheel span, further reduce the wear of the wheels, and further improve the structural reliability of the all-terrain vehicle 100.

As shown in FIG. 1 and FIG. 3, the included angle between the control rod 52 and the lower tie rod 51 is d, and d satisfies the relationship: 0°<d<5°. Under the premise that there is an included angle between the control rod 52 and the lower tie rod 51, the angle between the control rod 52 and the lower tie rod 51 is reasonably configured to prevent the control rod 52 from losing the function of controlling and adjusting wheels due to an excessive included angle between the control rod 52 and the lower tie rod 51. In addition, the control rod 52 can be conveniently mounted between the upper tie rod 50 and the lower tie rod 51, and the included angle between the control rod 52 and the lower tie rod 51 is prevented from being too large to cause the control rod 52 to occupy too much space in the vertical direction, and to cause a larger interval between the lower tie rod 51 and the control rod 52 so that the wheels cannot be effectively controlled and adjusted.

As shown in FIG. 3, the length of the control rod 52 is greater than the length of the upper tie rod 50 and greater than the length of the lower tie rod 51, which not only can increase toe values of the wheels to make the all-terrain vehicle 100 tend to understeer, but also can facilitate the adjustment of wheel positioning parameters by the control rod 52, and further improve the structural performance of the all-terrain vehicle 100 without changing the mounting positions and structures of the upper tie rod 50 and the lower tie rod 51, thereby improving user's experience and operation on the all-terrain vehicle 100.

As shown in FIG. 3, the outer end of the control rod 52 is outward beyond the line connecting the outer end of the upper tie rod 50 and the outer end of the lower tie rod 51, so that the connecting positions of the outer ends of the control rod 52, the upper tie rod 50 and the lower tie rod 51 on the axle support 40 are not on a straight line, and the control rod 52, the upper tie rod 50 and the lower tie rod 51 can control and adjust the roll angle and toe angle of the wheels from different angles, which can further improve the stability of the wheels and further improve the reliability of the all-terrain vehicle 100.

As shown in FIG. 3, the inner end of the control rod 52 is inward beyond the line connecting the inner end of the upper tie rod 50 and the inner end of the lower tie rod 51. Specifically, the inner end of the control rod 52 is arranged inward beyond the line connecting the inner end of the upper tie rod 50 and the inner end of the lower tie rod 51, which can further increase the length of the control rod 52 and further facilitate the control and adjustment of wheel positioning parameters by the control rod 52.

Figure 4:
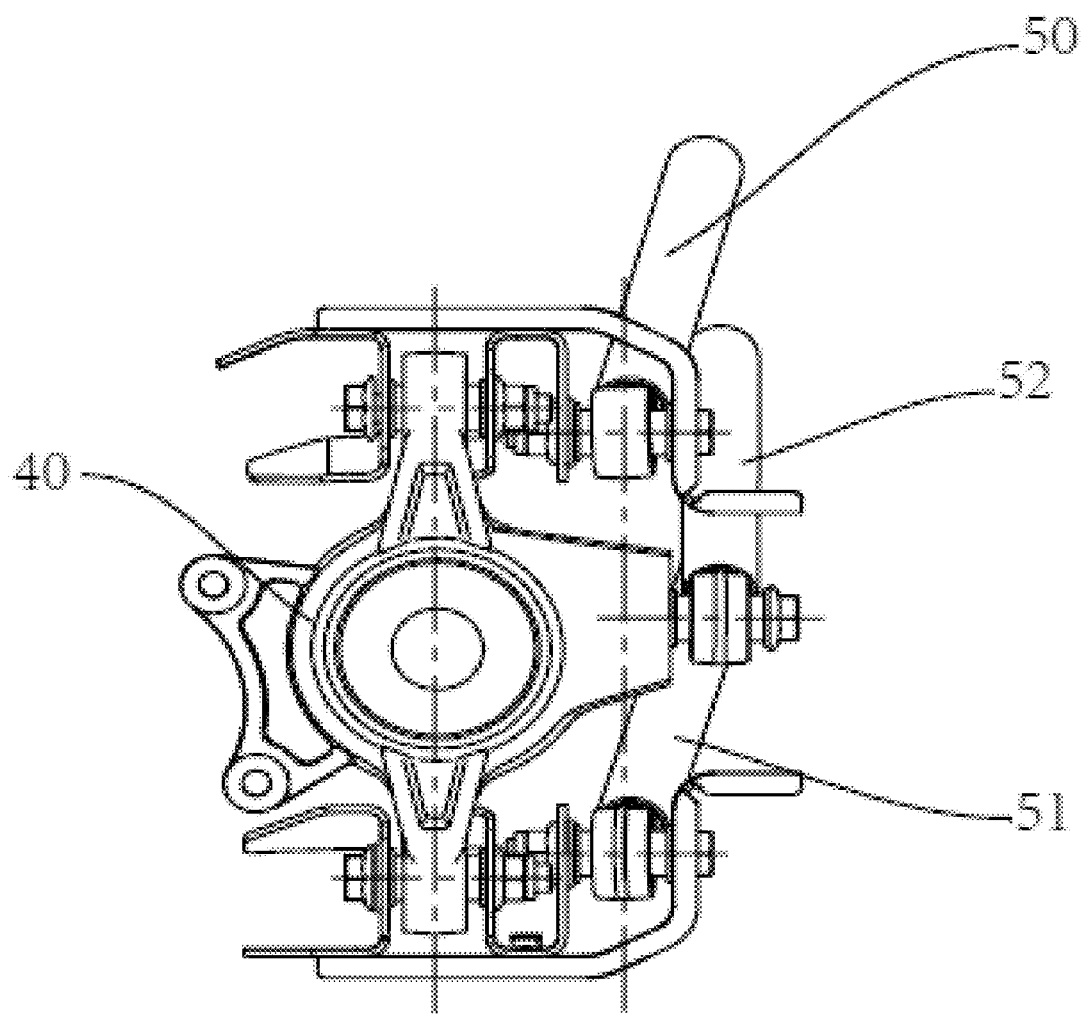
FIG. 4 is a partial structural side view of the all-terrain vehicle according to an embodiment of the present disclosure.

As shown in FIG. 3 and FIG. 4, the outer end of the control rod 52 is located on the rear side of the line connecting the outer end of the upper tie rod 50 and the outer end of the lower tie rod 51. With such configuration, when the all-terrain vehicle 100 rotates or runs on bumpy roads and the wheels move up and down or roll inward and outward, the control rod 52, the upper tie rod 50 and the lower tie rod 51 can control and adjust the wheels from different directions, with better adjustment effects on the positioning parameters for the wheels, which can further improve the stability and ride comfort of the all-terrain vehicle 100.

An all-terrain vehicle 100 according to some embodiments of the present disclosure is described below with reference to FIGS. 5-11.

Figure 5:
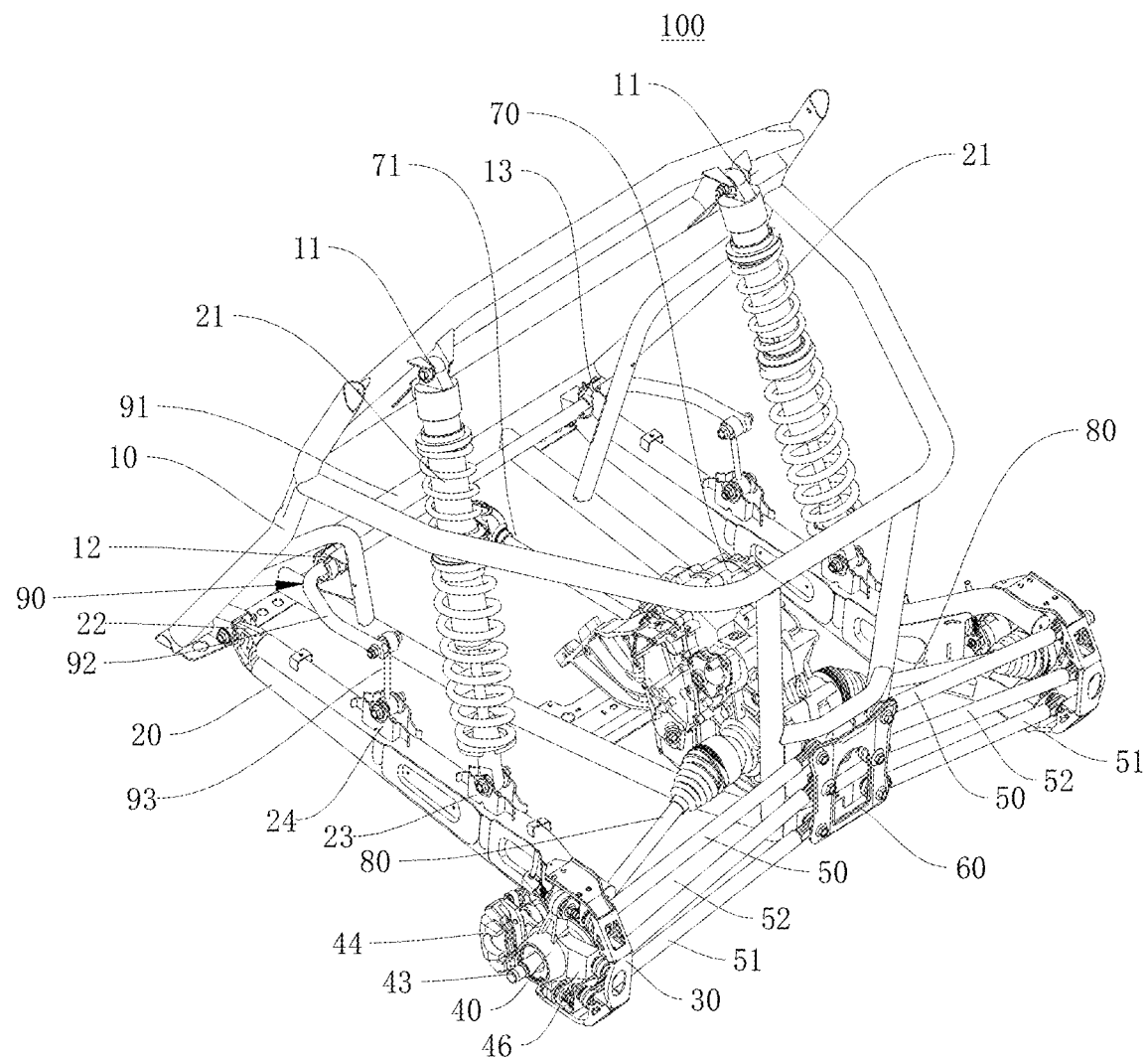
FIG. 5 is a perspective view of the all-terrain vehicle according to an embodiment of the present disclosure.
Figure 8:
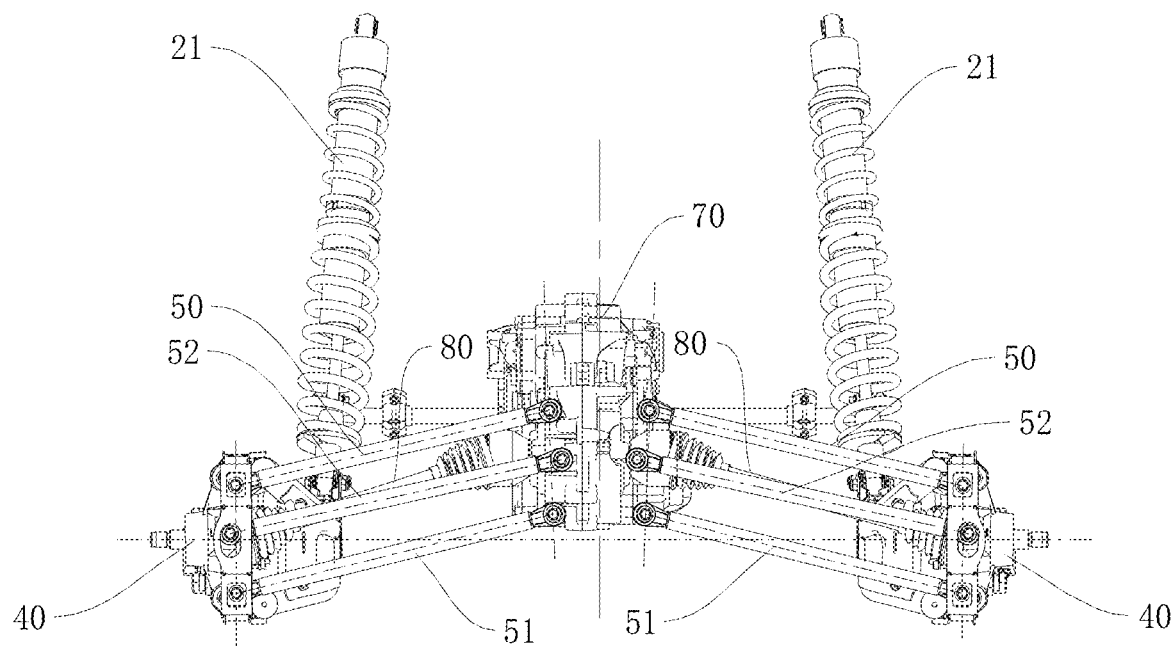
FIG. 8 is a rear view of the all-terrain vehicle according to an embodiment of the present disclosure.
Figure 11:
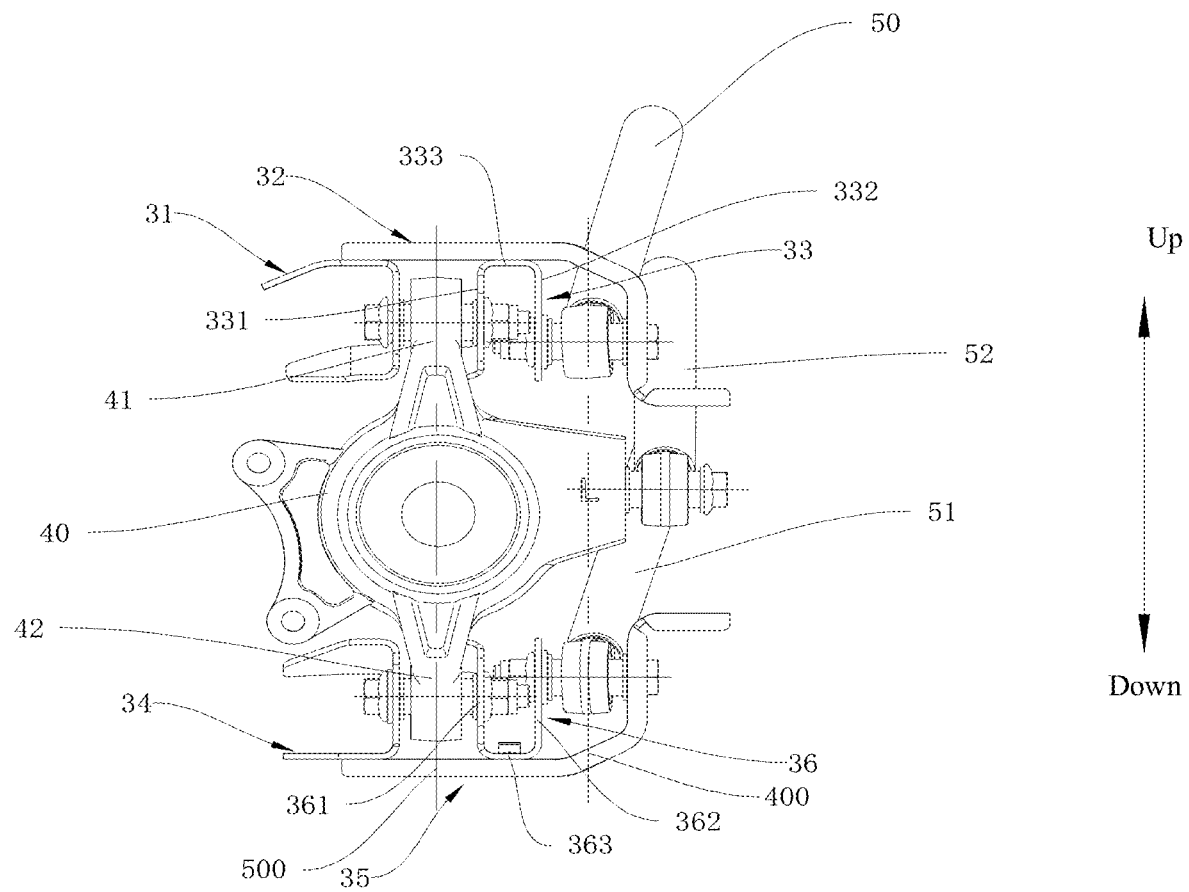
FIG. 11 is a partial structural side view of the all-terrain vehicle according to an embodiment of the present disclosure from another perspective.

As shown in FIGS. 5, 8 and 11, the all-terrain vehicle 100 includes: a frame 10, a trailing arm 20, a bracket assembly 30, an axle support 40, an upper tie rod 50 and a lower tie rod 51. The frame 10 is a base of the vehicle and can support almost all parts on the vehicle.

Figure 6:
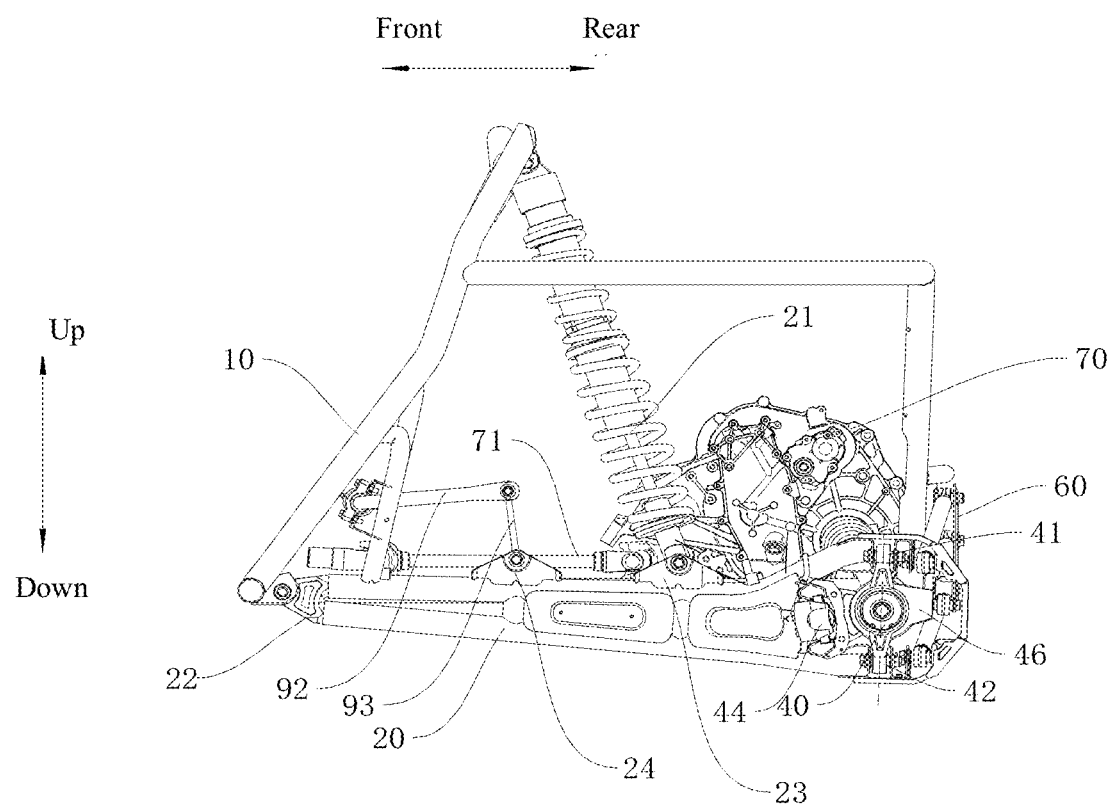
FIG. 6 is a side view of the all-terrain vehicle according to an embodiment of the present disclosure.
Figure 9:
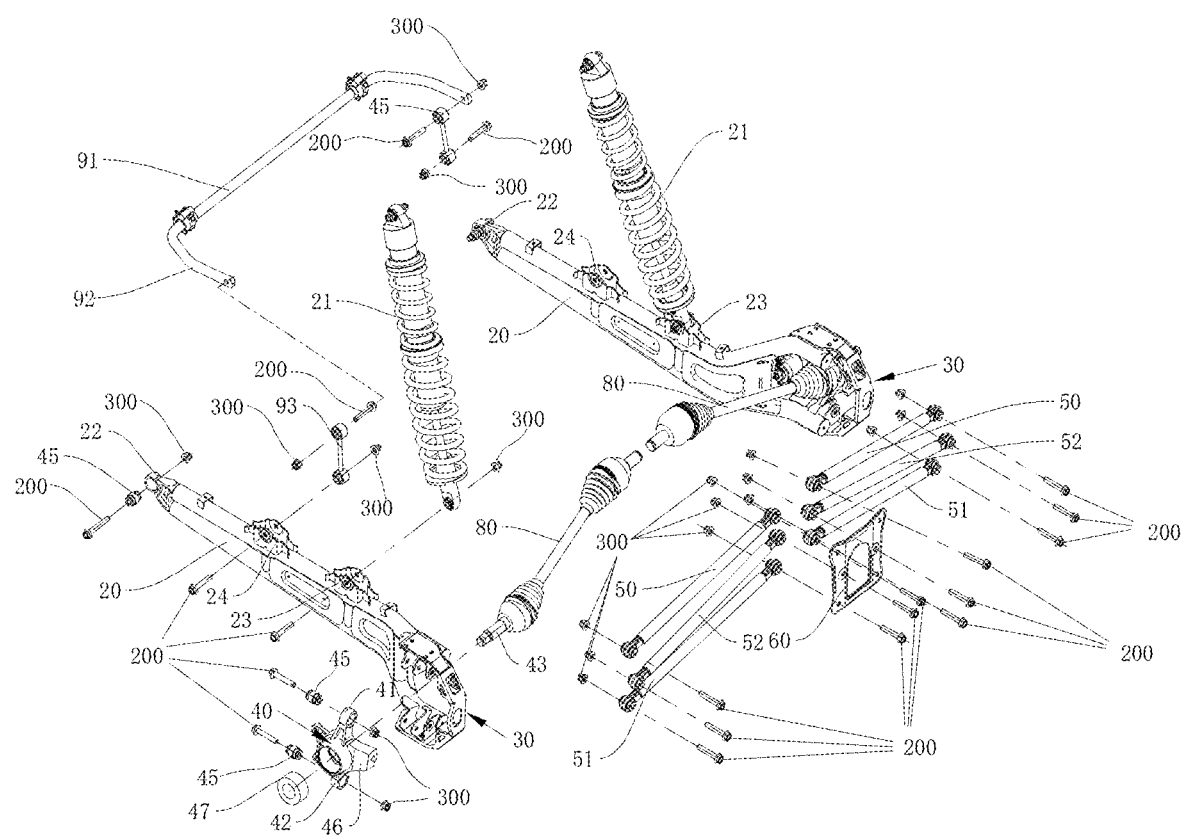
FIG. 9 is an exploded view of the all-terrain vehicle according to an embodiment of the present disclosure.

As shown in FIGS. 6 and 9, the trailing arm 20 is arranged in the front-rear direction of the frame 10, and there may be two trailing arms 20. The two trailing arms 20 are respectively arranged on left and right sides of the frame 10, the trailing arms 20 are a main body for connecting the front and rear ends of the frame 10, and the front ends of the trailing arms 20 are connected to the frame 10, for example, first mounting seats 22 at the front ends of the trailing arms 20 may be rotatably connected to the frame 10 through joint bearings 45. There are two bracket assemblies 30, and the two bracket assemblies 30 are respectively connected to the rear ends of the two trailing arms 20, for example, the bracket assemblies 30 may be connected to the rear ends of the trailing arms 20 by integral molding, which can reduce the mounting steps of connection between the rear ends of the trailing arms 20 and the bracket assemblies 30, so as to improve production efficiency.

As shown in FIG. 6, the two axle supports 40 each have an upper mounting end 41 and a lower mounting end 42, which are spaced in the vertical direction, and the upper mounting end 41 and the lower mounting end 42 are both connected to the rear end of the trailing arm 20. Specifically, the upper mounting end 41 is connected to the upper end of the bracket assembly 30, the lower mounting end 42 is connected to the lower end of the bracket assembly 30, and the upper mounting end 41 and the lower mounting end 42 are collinear with the center of the axle support 40, so that the axle support 40 can be stably connected with the bracket assembly 30. In addition, two axle supports 40 are configured, and the two axle supports 40 are respectively connected to the bracket assemblies 30 on the left and right sides. The axle supports 40 may be rotatably connected to axles 43 of wheels to drive the all-terrain vehicle 100 to move by means of the rotation of the wheels on the axle support 40.

Figure 7:
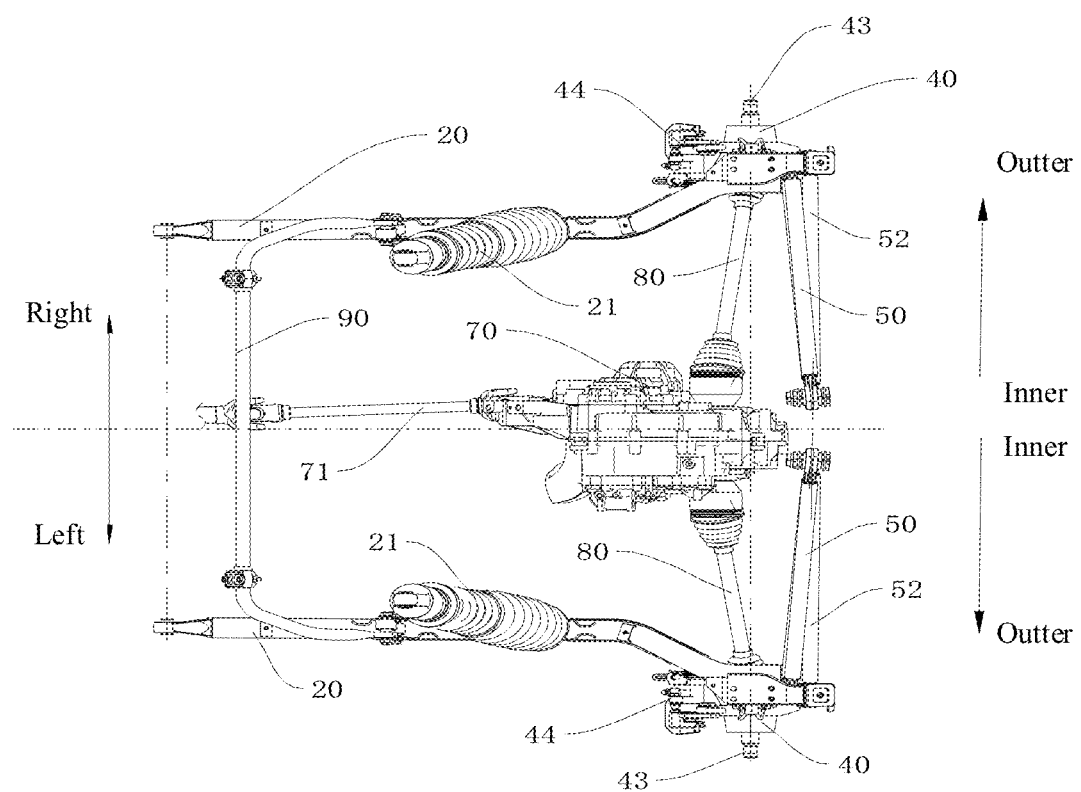
FIG. 7 is a top view of the all-terrain vehicle according to an embodiment of the present disclosure.

As shown in FIGS. 7 and 8, there are two upper tie rods 50 and two lower tie rods 51, the two upper tie rods 50 and the two lower tie rods 51 are arranged symmetrically about the longitudinal center line of the frame 10. the inner ends of the upper tie rods 50 are connected to the frame 10, the outer ends of the upper tie rods 50 are mounted at the rear ends of the trailing arms 20, the inner ends of the lower tie rods 51 are connected to the frame 10, the outer ends of the lower tie rods 51 are mounted at the rear ends of the trailing arms 20, and the lower tie rods 51 are located below the upper tie rods 50. It should be noted that the inner ends of the upper tie rods 50 and the lower tie rods 51 refer to the ends of the upper tie rods 50 and the lower tie rods 51 close to the longitudinal center line of the frame 10, and the outer ends of the upper tie rods 50 and the lower tie rods 51 refer to the ends of the upper tie rods 50 and the lower tie rods 51 facing the axle supports 40. Through the upper tie rods 50 and the lower tie rods 51, the camber angle of the all-terrain vehicle 100 during travel can be automatically changed, the lateral force borne by the wheels can also be absorbed, and the inclination of the all-terrain vehicle 100 can be reduced when the wheels turn.

In addition, as shown in FIG. 11, the mounting axis of the upper mounting end 41 at the rear end of the trailing arm 20 and the mounting axis of the outer end of the upper tie rod 50 on the trailing arm 20 are non-collinear, and/or the mounting axis of the lower mounting end 42 on the trailing arm 20 and the mounting axis of the outer end of the lower tie rod 51 on the trailing arm 20 are non-collinear.

That is, according to some embodiments of the present disclosure, the mounting axis of the upper mounting end 41 may be non-collinear with the mounting axis of the outer end of the upper tie rod 50, and the mounting axis of the lower mounting end 42 may be collinear with the mounting axis of the outer end of the lower tie rod 51. According to other embodiments of the present disclosure, the mounting axis of the upper mounting end 41 may be collinear with the mounting axis of the outer end of the upper tie rod 50, and the mounting axis of the lower mounting end 42 may be non-collinear with the mounting axis of the outer end of the lower tie rod 51. According to still other embodiments of the present disclosure, the mounting axis of the upper mounting end 41 is non-collinear with the mounting axis of the outer end of the upper tie rod 50, and the mounting axis of the lower mounting end 42 is non-collinear with the mounting axis of the outer end of the lower tie rod 51.

In the embodiments of the present disclosure, the third mounting mode is adopted, so that the upper tie rod 50 and the lower tie rod 51 have a larger movable space in the vertical direction, the travels of the upper tie rod 50 and the lower tie rod 51 in the vertical direction can be increased, and the all-terrain vehicle travels more smoothly on bumpy roads, thereby improving the driving experience. In addition, the mounting ends of the axle support 40, the ends of the upper tie rod 50 and the ends of the lower tie rod 51 all need to be fixed by fasteners, which can reduce the strength of the fasteners and improve the structural reliability of the all-terrain vehicle 100.

As shown in FIGS. 8 and 11, the mounting axis of the upper mounting end 41 on the trailing arm 20 is located outside the mounting axis of the outer end of the upper tie rod 50 in the inner-outer direction, and/or, the mounting axis of the lower mounting end 42 is located outside the mounting axis of the outer end of the lower tie rod 51 in the outer-inner direction. It is understandable that the misalignment of the mounting axis of the upper mounting end 41 and the mounting axis of the outer end of the upper tie rod 50, and the misalignment of the mounting axis of the lower mounting end 42 and the mounting axis of the outer end of the lower tie rod 51 can reduce spaces required by the arrangement of the axle support 40, the upper tie rod 50 and the lower tie rod 51 in the outer-inner direction. In addition, the misalignment of the mounting axes can provide clearance spaces, which can facilitate the installation and removal of the axle support 40, the upper tie rod 50 and the lower tie rod 51.

As shown in FIGS. 8 and 11, the mounting axis of the upper mounting end 41 is located above the mounting axis of the outer end of the upper tie rod 50 in the up-down direction, and/or the mounting axis of the lower mounting end 42 is located above the mounting axis of the outer end of the lower tie rod 51. It is understandable that the misalignment of the mounting axis of the upper mounting end 41 and the mounting axis of the outer end of the upper tie rod 50, and the misalignment of the mounting axis of the lower mounting end 42 and the mounting axis of the outer end of the lower tie rod 51 can reduce spaces required by the arrangement of the axle support 40, the upper tie rod 50 and the lower tie rod 51 in the up-down direction. In addition, the misalignment of the mounting axes can provide clearance spaces, which can facilitate the installation and removal of the axle support 40, the upper tie rod 50 and the lower tie rod 51.

As shown in FIGS. 8 and 11, the outer end of the upper tie rod 50 is located on the rear side of the upper mounting end 41 in the front-rear direction, and the outer end of the lower tie rod 51 is also located on the rear side of the lower mounting end 42, which can facilitate the connection between the upper tie rod 50 and the upper mounting end 41 and the connection between the lower tie rod 51 and the lower mounting end 42, prevent the installation of the upper tie rod 50 and the lower tie rod 51 from affecting the installation of other components of the all-terrain vehicle 100, and make the mass distribution of the all-terrain vehicle 100 in the front-rear direction more uniform, so that the structural distribution of the all-terrain vehicle 100 can be more reasonable, and the structural design of the all-terrain vehicle 100 can be optimized.

As shown in FIG. 11, the mounting axis of the upper mounting end 41 is parallel to the mounting axis of the outer end of the upper tie rod 50, and/or the mounting axis of the lower mounting end 42 is parallel to the mounting axis of the outer end of the lower tie rod 51. That is, the mounting axis of the upper mounting end 41 and the mounting axis of the outer end of the upper tie rod 50 can be arranged in parallel, and the mounting axis of the lower mounting end 42 and the mounting axis of the outer end of the lower tie rod 51 can also be arranged in parallel, or the mounting axis of the upper mounting end 41 and the mounting axis of the outer end of the upper tie rod 50, as well as the mounting axis of the lower mounting end 42 and the mounting axis of the outer end of the lower tie rod 51 can be arranged in parallel.

In the embodiment of the present disclosure, the mounting axis of the upper mounting end 41 and the mounting axis of the outer end of the upper tie rod 50, as well as the mounting axis of the lower mounting end 42 and the mounting axis of the outer end of the lower tie rod 51 can be arranged in parallel, so that the force of the upper tie rod 50 or the lower tie rod 51 and the axle support 40 on the bracket assembly 30 is distributed more evenly to avoid stress concentration and protect the structure of the bracket assembly 30, and the connection relationship between the upper mounting end 41 and the upper tie rod 50 and the connection relationship between the lower mounting end 42 and the lower tie rod 51 are not easily damaged.

In an embodiment of the present disclosure, as shown in FIGS. 9 and 11, the axle support 40 is correspondingly connected with an axle 43, the center line between the outer end of the upper tie rod 50 and the outer end of the lower tie rod 51 is a first straight line 400, and the first straight line 400 is arranged in parallel to a rotation kingpin axis 500 of the axle 43. It is understandable that if the center line between the outer end of the upper tie rod 50 and the outer end of the lower tie rod 51 has a certain inclination angle with the rotation kingpin axis 500 of the axle 43, when the all-terrain vehicle 100 is running, the outer end of the upper tie rod 50 and the outer end of the lower tie rod 51 generate different magnitudes of force on the upper and lower ends of the bracket assembly 30, which not only affects the structural strength of the bracket assembly 30, but also affects the normal rotation of the axle 43. Correspondingly, when the normal rotation of the axle 43 is affected, the connection relationship between the upper tie rod 50 or the lower tie rod 51 and the bracket assembly 30 will be affected, and then the travels of the upper and lower tie rods 50 and 51 in the vertical direction will be affected. Therefore, the reasonable arrangement of the outer end of the upper tie rod 50, the outer end of the lower tie rod 51 and the axle support 40 can improve the overall structural strength of the all-terrain vehicle 100 and ensure the running stability of the all-terrain vehicle.

As shown in FIG. 9, the all-terrain vehicle may further mainly include: a bracket assembly 30, the bracket assembly 30 being connected to the rear end of the trailing arm 20, and the outer end of the upper tie rod 50 and the outer end of the lower tie rod 51 being respectively connected to the bracket assembly 30. Specifically, the outer ends of the upper tie rod 50 and the lower tie rod 51 are first respectively connected to the bracket assembly 30, and then the bracket assembly 30 provided with the upper tie rod 50 and the lower tie rod 51 is integrally connected to the rear end of the trailing arm 20.

With such arrangement, the outer ends of the upper tie rod 50 and the lower tie rod 51 can be simultaneously mounted on the trailing arm 20 to improve the mounting efficiency, and the outer ends of the upper tie rod 50 and the lower tie rod 51 can be conveniently disassembled and replaced, that is, the outer ends of the upper tie rod 50 and the lower tie rod 51 can be detached only by detaching the bracket assembly 30 from the trailing arm 20, without separately detaching the upper tie rod 50 and the lower tie rod 51 in sequence.

In addition, the bracket assembly 30 can not only increase the strength of installation of the outer ends of the upper tie rod 50 and the lower tie rod 51 on the trailing arm 20, but also can protect the outer ends of the upper tie rod 50 and the lower tie rod 51, and can prevent external forces from impacting the outer ends of the upper tie rod 50 and the lower tie rod 51 to damage the outer ends of the upper tie rod 50 and the lower tie rod 51, which can further improve the structural reliability of the all-terrain vehicle 100.

Further, a rear brake inlay 44 is also arranged at the rear end of the trailing arm 20. The rear brake inlay 44 can be in contact with the front end of the axle support 40 to prevent the axle 43 of the wheel from rotating. Specifically, a brake pad may be installed on the rear brake inlay 44, and a brake disc may be installed on the axle 43 of the wheel. The wheel can be braked by friction between the brake pad and the brake disc, which can improve the controllability of the all-terrain vehicle 100.

As shown in FIG. 11, the bracket assembly 30 includes: a first upper bracket 31, a second upper bracket 32, a third upper bracket 33, a first lower bracket 34, a second lower bracket 35 and a third lower bracket 36. The first upper bracket 31 and the first lower bracket 34 are arranged oppositely and connected to the rear end of the trailing arm 20, the second upper bracket 32 is connected between the first upper bracket 31 and the third upper bracket 33, the second lower bracket 35 is connected between the first lower bracket 34 and the third lower bracket 36, the upper mounting end 41 of the axle support 40 is arranged between the first upper bracket 31 and the third upper bracket 33, and the lower mounting end 42 of the axle support 40 is arranged between the first lower bracket 34 and the third lower bracket 36. The outer end of the upper tie rod 50 is arranged between the second upper bracket 32 and the third upper bracket 33, and the outer end of the lower tie rod 51 is arranged between the second lower bracket 35 and the third lower bracket 36.

It is understandable that the vertically opposite arrangement of the first upper bracket 31 and the first lower bracket 34 can ensure that the upper mounting end 41 of the axle support 40 and the lower mounting end 42 of the axle support 40 are collinear with the center of the axle support, to avoid the generation of an inclination angle from causing the interaction force generated after the installation of the upper mounting end 41 of the axle support 40 and the bracket assembly 30 to be different from the interaction force generated by the lower mounting end 42 of the axle support 40 and the bracket assembly 30, which thereby affects the structural strength of the bracket assembly 30. Therefore, both the upper mounting end 41 of the axle support 40 and the lower mounting end 42 of the axle support 40 are arranged in the vertical direction, to improve the structural strength of the bracket assembly 30. Moreover, the bracket assembly 30 arranged in this way can complete the fixing of multiple mounts through brackets, and can also prevent the corresponding mounting ends from being collinear to hinder the installation of fasteners.

Figure 10:
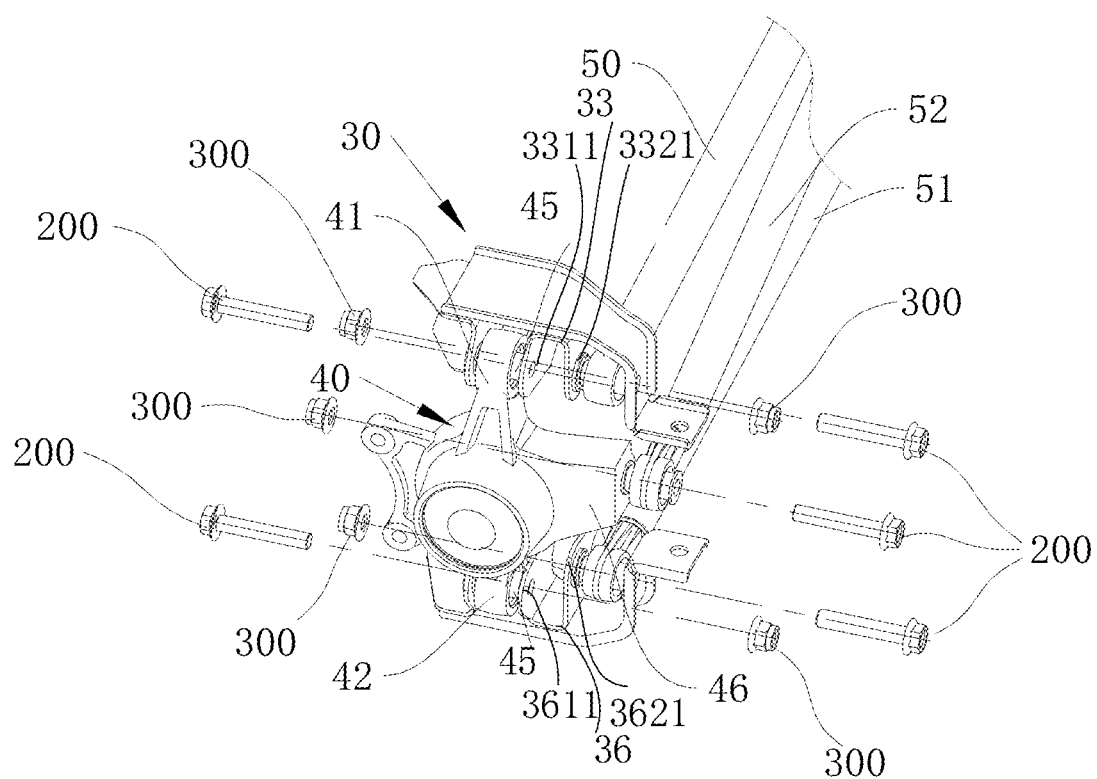
FIG. 10 is a partial structural exploded view of the all-terrain vehicle according to an embodiment of the present disclosure from one perspective.

Further, as shown in FIGS. 10 and 11, the third upper bracket 33 includes: a first mounting plate 331, a second mounting plate 332 and a first connecting plate 333. The first connecting plate 333 is connected to the second upper bracket 32, the first mounting plate 331 is provided with a first mounting hole 3311, and the first mounting plate 331 corresponds to the upper mounting end 41. The second mounting plate 332 is provided with a second mounting hole 3321, and the second mounting plate 332 corresponds to the outer end of the upper tie rod 50. The first mounting plate 331 and the second mounting plate 332 are misaligned with one arranged inside and the other arranged outside, so that the axes of the first mounting hole 3311 and the second mounting hole 3321 are non-collinear. The first mounting plate 331, the second mounting plate 332 and the first connecting plate 333 may be of an integrally formed structure, which facilitates processing and can also reduce the installation steps of the third upper bracket 33. The first mounting plate 331 corresponds to the upper mounting end 41, which can facilitate the installation of the first mounting hole 3311 with the upper mounting end 41. The second mounting plate 332 corresponds to the outer end of the upper tie rod 50, which can facilitate the installation of the second mounting hole 3321 with the outer end of the upper tie rod 50. The misalignment of the first mounting plate 331 and the second mounting plate 332 can realize the misalignment of the first mounting hole 3311 and the second mounting hole 3321, so that the axle support 40 can be assembled with the outer end of the upper tie rod 50 and the bracket assembly 30 more conveniently, and the assembled structure is more compact.

Alternatively, as shown in FIGS. 10 and 11, the third lower bracket 36 includes: a third mounting plate 361, a fourth mounting plate 362 and a second connecting plate 363. The second connecting plate 363 is connected to the second lower bracket 35, the third mounting plate 361 is provided with a third mounting hole 3611, and the third mounting plate 361 corresponds to the lower mounting end 42. The fourth mounting plate 362 is provided with a fourth mounting hole 3621, and the fourth mounting plate 362 corresponds to the outer end of the lower tie rod 51. The third mounting plate 361 and the fourth mounting plate 362 are misaligned with one arranged inside and the other arranged outside, so that the axes of the third mounting hole 3611 and the fourth mounting hole 3621 are non-collinear. The third mounting plate 361, the fourth mounting plate 362 and the second connecting plate 363 may be of an integrally formed structure, which facilitates processing and can also reduce the installation steps of the third lower bracket 36. The third mounting plate 361 corresponds to the lower mounting end 42, which can facilitate the installation of the third mounting hole 3611 with the lower mounting end 42. The fourth mounting plate 362 corresponds to the lower tie rod 51, which can facilitate the installation of the fourth mounting hole 3621 with the lower tie rod 51. The misalignment of the third mounting plate 361 and the fourth mounting plate 362 can realize the misalignment of the third mounting hole 3611 and the fourth mounting hole 3621, so that the axle support 40 can be assembled with the outer end of the lower tie rod 51 and the bracket assembly 30 more conveniently, and the assembled structure is more compact.

Further, as shown in FIG. 11, both the third upper bracket 33 and the third lower bracket 36 can be arranged in the above two solutions, so that the third upper bracket 33 and the third lower bracket 36 are arranged oppositely in the vertical direction, the structure formed by the connection of the third upper bracket 33 the third lower bracket 36 with the axle support 40, upper tie rod 50 and lower tie rod 51 is more reasonable and compact, and the structural strength of the bracket assembly 30 can be improved.

In an embodiment of the present disclosure, the all-terrain vehicle 100 further includes: a control rod 52 (also referred to as a toe control rod), an outer end of the control rod 52 being connected to the axle support 40, an inner end of the control rod 52 being connected to the frame 10, and the control rod 52 being located between the upper tie rod 50 and the lower tie rod 51. The number of control rods 52 is two, and the two control rods 52 are arranged symmetrically about the center line of the frame 10. The control rod 52 on the left can control the left wheel, and the control rod 52 on the right can control the right wheel. For example, the control rods 52 can facilitate the return of the wheels when the vehicle turns, that is, the control rods 52 can ensure straight driving of the vehicle. Through the control rods 52, wheel positioning parameters such as a kingpin caster angle and a kingpin inclination angle can be effectively adjusted, so that the rear wheels can obtain a larger travel in the up-down direction; and the control rods 52 can effectively control the motion trajectory of the rear wheels.

As shown in FIGS. 6 and 8, the outer end of the upper tie rod 50 is located on the rear side of the upper mounting end 41, the outer end of the lower tie rod 51 is located on the rear side of the lower mounting end 42, the rear end of the axle support 40 is provided with a toe knuckle arm seat 46, and the outer end of the control rod 52 is connected to the toe knuckle arm seat 46. Specifically, the toe knuckle arm seat 46 is provided with a threaded hole, and the outer end of the control rod 52 can be connected with the threaded hole on the toe knuckle arm seat 46 by a fastener.

In addition, the upper tie rod 50, the lower tie rod 51 and the control rod 52 are all connected to the rear side of the axle support 40, so that the axle support 40 can be controlled simultaneously in all directions by the upper tie rod 50, the lower tie rod 51 and the control rod 52, to control the running state of the vehicle. It is understandable that if the upper tie rod 50, the lower tie rod 51 and the control rod 52 are arranged in different directions, there may be mutual interference. Therefore, the upper tie rod 50, the lower tie rod 51 and the control rod 52 are all arranged on the rear side of the axle support 40, which can improve the control performance.

Further, the length of the control rod 52 is greater than the length of the upper tie rod 50 and greater than the length of the lower tie rod 51. In this way, the control rod 52 can have better control performance than the upper tie rod 50 and the lower tie rod 51, so that the bracket assembly 30 can have a larger travel in the up-down direction.

In addition, the outer end of the control rod 52 is outward beyond the line connecting the outer end of the upper tie rod 50 and the outer end of the lower tie rod 51, and/or the inner end of the control rod 52 is inward beyond the line connecting the inner end of the upper tie rod 50 and the inner end of the lower tie rod 51.

That is, the outer end of the control rod 52 may be outward beyond the line connecting the outer end of the upper tie rod 50 and the outer end of the lower tie rod 51, or the inner end of the control rod 52 may also be inward beyond the line connecting the inner end of the upper tie rod 50 and the inner end of the lower tie rod 51, or the outer end of the control rod 52 is outward beyond the line connecting the outer end of the upper tie rod 50 and the outer end of the lower tie rod 51, and the inner end of the control rod 52 is also inward beyond the line connecting the inner end of the upper tie rod 50 and the inner end of the lower tie rod 51.

In the embodiments of the present disclosure, the third solution described above is used, that is, the length of the control rod 52 is greater than the lengths of the upper tie rod 50 and the lower tie rod 51, so that the movement of the bracket assembly 30 in the up-down direction is more stable.

In an embodiment of the present disclosure, as shown in FIG. 5, the all-terrain vehicle 100 further includes: a fixed plate 60. The fixed plate 60 is arranged on the rear side of the frame 10, and the inner end of the control rod 52, the inner end of the upper tie rod 50 and the inner end of the lower tie rod 51 are all arranged on the fixed plate 60. The fixed plate 60 is fixedly connected to the frame 10, so that the inner end of the control rod 52, the inner end of the upper tie rod 50 and the inner end of the lower tie rod 51 are all fixed, which can ensure the stability of the all-terrain vehicle 100.

Further, as shown in FIG. 5, the all-terrain vehicle 100 further includes: a driving device 70, an axle shaft 80 and a stabilizer bar 90. The driving device 70 is arranged on the frame 10, the axle shaft 80 is in transmission fit with the driving device 70, and an outer end of the axle shaft 80 extends toward the axle support 40. The stabilizer bar 90 is arranged on the frame 10 and the trailing arm 20, and the stabilizer bar 90 is located on the front side of the axle shaft 80 and on the front side of the driving device 70. It can be understood that there are two axle shafts 80. One ends of the axle shafts 80 are connected to both sides of the driving device 70, and the other ends are provided with an axle 43. The axle 43 passes through the axle support 40 and a hub bearing 47. The hub bearing 47 can reduce the friction between the axle 43 and the axle support 40, so as to protect the axle support 40. The stabilizer bar 90 is arranged on the frame 10 and the trailing arm 20 to improve the stability of the frame 10, and the stabilizer bar 90 is located on the upper front side of the axle shaft 80, which enables the rear space of the vehicle to be larger, increases the formation of rear suspension movement. and will not cause interference to the transmission of the axle shaft 80. The driving device may be a fuel engine.

In detail, as shown in FIGS. 5 and 6, the stabilizer bar 90 includes: a main bar section 91 and branch bar sections 92. The main bar section 91 is arranged on the frame 10, the branch bar sections 92 are connected to both sides of the main bar section 91, the branch bar sections 92 extend toward a rear direction, and the rear end of each of the branch bar sections 92 is coupled to an upper part of the trailing arm 20. It can be understood that the branch bar sections 92 of the stabilizer bar 90 and the trailing arm 20 extend in the same direction, which can ensure the stability of the stabilizer bar 90 on the trailing arms 20.

In addition, as shown in FIGS. 5 and 6, the all-terrain vehicle 100 further includes a shock absorber 21, a second mounting seat 23 is further arranged on the rear end of the trailing arm 20, and the shock absorber 21 is connected to the trailing arm 20 through the second mounting seat 23. The number of shock absorbers 21 may be two, respectively located above the two trailing arms 20. The shock absorbers 21 may be composed of damping springs, and the damping springs have a buffering effect and can absorb vibration generated by the vehicle on bumpy roads, which can improve driving comfort.

In more detail, a third mounting seat 24 is further arranged between the first mounting seat 22 and the second mounting seat 23, a connecting rod section 93 is further arranged between the support rod section 92 and the trailing arm 20, one end of the connecting rod section 93 is connected to the support rod section 92, and the other end of the connecting rod section 93 is connected to the trailing arm 20 through the third mounting seat 24. The support rod section 92 and the connecting rod section 93 can rotate relatively. In this way, when the vehicle bumps during driving, the relative rotation of the support rod section 92 and the connecting rod section 93 can further improve the passability and stability of the vehicle.

In an embodiment of the present disclosure, the all-terrain vehicle 100 further includes a rear transmission shaft 71, one end of the rear transmission shaft 71 is connected to the driving device 70, and the other end can be connected to a front transmission shaft of the all-terrain vehicle 100. The connection point of the rear transmission shaft 71 and the front transmission shaft is located behind the main bar section 91 to transmit the power outputted by the driving device 70 to the front wheels, so that the vehicle is driven by four wheels, which makes the vehicle more powerful and have a better driving experience.

A rear suspension system of the all-terrain vehicle 100 according to an embodiment of the present disclosure is described in detail below.

As shown in FIG. 9, with bolts 200 and nuts 300, one end of the upper tie rod 50 is mounted between the second mounting plate 332 and the second upper bracket 32, one end of the lower tie rod 51 is mounted between the fourth mounting plate 362 and the second lower bracket 35, the upper mounting end 41 of the left axle support 70 is mounted between the first upper bracket 31 and the first mounting plate 331, and the lower mounting end 42 of the left axle support 70 is mounted between the first lower bracket 34 and the third mounting plate 361. One end of the control rod 52 is also mounted on the toe knuckle arm seat 46 of the axle support 40 with a bolt 200 and a nut 300. Then, the assembled left trailing arm 20 as a whole is mounted on the frame 10 with a bolt 200 and a nut 300 by inserting the joint bearing 45 in a joint bearing 45 hole in the front mounting seat 22 at the front end of the trailing arm 20.

In addition, the other ends of the upper tie rod 50, the lower tie rod 51 and the control rod 52 are respectively mounted on the fixed plate 60, thus forming a left suspension guide mechanism. The lateral control moment arm effect applied by the upper tie rod 50 and the lower tie rod 51 can accurately control the changes of the camber angle and side slip of the wheel when the wheel hops up and down, thereby reducing tire wear.

Inner ball cage ends of the left and right axle shafts 80 driven at a uniform speed are respectively mounted in mounting holes of the rear driving devices 70, and outer ball cage ends are respectively mounted in the hub bearings 47 in the left and right axle supports 40.

Finally, the upper end of the shock absorber 21 is mounted on the support 11 of the frame 10 with a bolt 200 and a nut 300, and the lower end of the shock absorber 21 is mounted on the rear mounting seat 23 of the trailing arm 20. The overall installation of the right trailing arm 20 is the same as that of the left side.

In addition, after the rear suspension system is formed, as shown in FIGS. 6 and 10, during the up and down movement of wheels, the toe angle changes of the rear wheels can be adjusted and controlled by means of the kingpin axis rotation of the control rod 52 along the upper and lower joint bearings 45 of the axle support 40, to achieve a certain follow-up steering function in the left and right rear wheels when the vehicle turns, so that the entire vehicle tends to understeer when turning, and the stability of the vehicle during sharp turns is improved.

In addition, as shown in FIG. 6, in the suspension system, the stabilizer bar 90 is mounted on the left mounting seat 12 and the right mounting seat 13 of the frame 10 and placed above the rear transmission shaft 71, both ends of the stabilizer bar 90 are connected and mounted on the third mounting seats 24 of the rear left and right trailing arms 20 through the branch bar sections 92, and the operating direction and angle of the stabilizer bar 90 are the same as those of the left and right trailing arms 20, which can effectively utilize the longitudinal space of the rear compartment of the vehicle and improve the roll resistance of the whole vehicle.

In summary, the all-terrain vehicle 100 according to the embodiments of the present disclosure provides unique multi-link independent suspensions. In the left suspension, the front end of the longitudinal trailing arm 20 is connected to the frame 10, the tail end of the trailing arm 20 is connected to the bracket assembly 30, the axle support 40 is connected to the bracket assembly 30, and then the bracket assembly 30 of the trailing arm 20 is connected to the tail of the frame 10 through the upper tie rod 50 and the lower tie rod 51. Meanwhile, a separate control rod 52 is arranged between the upper tie rod 50 and the lower tie rod 51 placed horizontally in the vertical direction, one end of the control rod 52 is connected to the toe knuckle arm seat 46 of the axle support 40, and the other end is also mounted at the tail of the frame 10. Finally, the upper tie rod 50, the lower tie rod 51 and the control rod 52 are fixed to the tail of the frame 10 by means of the same fixed plate 60. The lower end of the shock absorber 21 is mounted on the trailing arm 20, the upper end of the shock absorber 21 is arranged in the same direction as the trailing arm 20, and the shock absorber 21 is connected with the frame 10 to form a rear suspension guiding movement mechanism to control the regular movement of the wheel up and down. In addition, the control rod 52 can effectively adjust wheel positioning parameters so that the rear wheel can obtain a larger travel, and can effectively control the motion trajectory of the rear wheel. It should be noted that, in the embodiments of the present disclosure, all the connection and hinge points adopt spherical sliding joint bearings 45, which can rotate and swing at any angle. The right suspension is arranged symmetrically along the middle plane of the frame.

In the description of the present disclosure, it is to be understood that terms such as "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", and "circumferential" should be construed to refer to the orientation or position as shown in the drawings. These terms are for convenience and simplicity of description, and do not indicate or imply that the device or element referred to must have a particular orientation, or be constructed and operated in a particular orientation. Thus, these terms should not be constructed to limit the present disclosure.

Reference throughout this specification to "an embodiment", "some embodiments", "an exemplary embodiment", "an example", "a specific example", or "some examples" means that a particular feature, structure, material, or characteristic described in connection with the embodiment or example is included in at least one embodiment or example of the present disclosure. Thus, the above terms throughout this specification are not necessarily referring to the same embodiment or example of the present disclosure.

Although embodiments of the present disclosure have been shown and described, it would be appreciated by those of ordinary skill in the art that various changes, modifications, alternatives and variations can be made in these embodiments without departing from the principles and purposes of the present disclosure. The scope of the present disclosure is defined by the claims and their equivalents.

What is claimed is:

1. An all-terrain vehicle, comprising:
a frame;
a trailing arm, a front end of the trailing arm being connected to the frame;
an upper tie rod, an inner end of the upper tie rod being connected to the frame and an outer end of the upper tie rod being mounted at a rear end of the trailing arm; and
a lower tie rod, an inner end of the lower tie rod being connected to the frame and an outer end of the lower tie rod being mounted at the rear end of the trailing arm, the lower tie rod being located below the upper tie rod, an included angle between the upper tie rod and the lower tie rod being a, and a satisfying a relationship: $0°<a<5°$.

2. The all-terrain vehicle according to claim 1, wherein an included angle between the upper tie rod and the horizontal plane is b, an included angle between the lower tie rod and the horizontal plane is c, and b and c satisfy a relationship: $b<c$.

3. The all-terrain vehicle according to claim 2, wherein b and c respectively satisfy relationships: $0°<b\leq28°$, $0°<c\leq30°$.

4. The all-terrain vehicle according to claim 1, wherein a satisfies a relationship: $0°<a<3°$.

5. The all-terrain vehicle according to claim 1, further comprising: an axle support and a toe control rod, an outer end of the toe control rod being connected to the axle support and an inner end of the toe control rod being connected to the frame, and the toe control rod being located between the upper tie rod and the lower tie rod.

6. The all-terrain vehicle according to claim 5, wherein the toe control rod has an included angle with the upper tie rod and an included angle with the lower tie rod.

7. The all-terrain vehicle according to claim 6, wherein the included angle between the toe control rod and the lower tie rod is d, and d satisfies a relationship: $0°<d<5°$.

8. The all-terrain vehicle according to claim 5, wherein,
a length of the toe control rod is greater than a length of the upper tie rod and greater than a length of the lower tie rod;
the outer end of the toe control rod is outward beyond a line connecting the outer end of the upper tie rod and the outer end of the lower tie rod; and/or
the inner end of the toe control rod is inward beyond a line connecting the inner end of the upper tie rod and the inner end of the lower tie rod.

9. The all-terrain vehicle according to claim 5, wherein a rear end of the axle support is provided with a toe knuckle arm seat, and the outer end of the toe control rod is connected to the toe knuckle arm seat.

10. An all-terrain vehicle, comprising: a frame; a trailing arm, a front end of the trailing arm being connected to the frame; an axle support, the axle support having an upper mounting end and a lower mounting end, and the upper mounting end and the lower mounting end being spaced in the vertical direction and connected to a rear end of the trailing arm; an upper tie rod, an inner end of the upper tie rod being connected to the frame and an outer end of the upper tie rod being mounted at the rear end of the trailing arm; and a lower tie rod, an inner end of the lower tie rod being connected to the frame and an outer end of the lower tie rod being mounted at the rear end of the trailing arm, and the lower tie rod being located below the upper tie rod, an included angle between the upper tie rod and the lower tie rod being a, and a satisfying a relationship: $0°<a<5$, wherein at least one of (a) and (b) is satisfied, and (a) and (b) are: (a) a mounting axis of the upper mounting end at the rear end of the trailing arm and a mounting axis of the outer end of the upper tie rod at the rear end of the trailing arm are non-collinear, and/or and (b) a mounting axis of the lower mounting end at the rear end of the trailing arm and a mounting axis of the outer end of the lower tie rod at the rear end of the trailing arm are non-collinear; and a bracket assembly connected to the rear end of the trailing arm, the outer end of the upper tie rod and the outer end of the lower tie rod being respectively connected to the bracket assembly, wherein the bracket assembly comprises: a first upper bracket, a second upper bracket, a third upper bracket, a first lower bracket, a second lower bracket and a third lower bracket, wherein the first upper bracket and the first lower bracket are arranged oppositely in the vertical direction and connected to the rear end of the trailing arm, the second upper bracket is connected between the first upper bracket and the third upper bracket, the second lower bracket is connected between the first lower bracket and the third lower bracket, the upper mounting end of the axle support is arranged between the first upper bracket and the third upper bracket and the lower mounting end of the axle support is arranged between the first lower bracket and the third lower bracket, the outer end of the upper tie rod and the second upper bracket are directly connected with a first connector, and the outer end of the upper tie rod and the third upper bracket are directly connected with the first connector; and the outer end of the lower tie rod and the second lower bracket are directly connected with a second connector, and the outer end of the lower tie rod and the third lower bracket are directly connected with the second connector.

11. The all-terrain vehicle according to claim 10, wherein the mounting axis of the upper mounting end at the rear end of the trailing arm is located outside the mounting axis of the outer end of the upper tie rod at the rear end of the trailing arm in an inner-outer direction; and/or
the mounting axis of the lower mounting end is located outside the mounting axis of the outer end of the lower tie rod in an outer-inner direction.

12. The all-terrain vehicle according to claim 10, wherein
the mounting axis of the upper mounting end is located above the mounting axis of the outer end of the upper tie rod in an up-down direction; and/or
the mounting axis of the lower mounting end is located above the mounting axis of the outer end of the lower tie rod in the up-down direction.

13. The all-terrain vehicle according to claim 10, wherein
the outer end of the upper tie rod is located on the rear side of the upper mounting end in a front-rear direction; and/or
the outer end of the lower tie rod is located on the rear side of the lower mounting end in the front-rear direction.

14. The all-terrain vehicle according to claim 10, wherein
the mounting axis of the upper mounting end and the mounting axis of the outer end of the upper tie rod are arranged in parallel; and/or
the mounting axis of the lower mounting end and the mounting axis of the outer end of the lower tie rod are arranged in parallel.

15. The all-terrain vehicle according to claim 10, wherein the axle support is correspondingly connected with an axle, a center line between the outer end of the upper tie rod and the outer end of the lower tie rod is a first straight line, and the first straight line is arranged in parallel to a rotation kingpin axis of the axle.

16. The all-terrain vehicle according to claim 10, wherein the third upper bracket comprises: a first mounting plate, a second mounting plate and a first connecting plate, wherein the first connecting plate is connected to the second upper bracket, the first mounting plate is provided with a first mounting hole and corresponds to the upper mounting end, the second mounting plate is provided with a second mounting hole and corresponds to the outer end of the upper tie rod, the first mounting plate and the second mounting plate are misaligned with one arranged inside and the other arranged outside, and axes of the first mounting hole and the second mounting hole are non-collinear; and/or the third lower bracket comprises: a third mounting plate, a fourth mounting plate and a second connecting plate, wherein the second connecting plate is connected to the second lower bracket, the third mounting plate is provided with a third mounting hole and corresponds to the lower mounting end, the fourth mounting plate is provided with a fourth mounting hole and corresponds to the outer end of the lower tie rod, the third mounting plate and the fourth mounting plate are misaligned with one arranged inside and the other arranged outside, and axes of the third mounting hole and the fourth mounting hole are non-collinear.

17. The all-terrain vehicle according to claim 10, further comprising: a driving device, an axle shaft and a stabilizer bar, wherein the driving device is arranged on the frame, the axle shaft is in transmission fit with the driving device and an outer end of the axle shaft extends toward the axle support;

the stabilizer bar is arranged on the frame and the trailing arm and located on an upper front side of the axle shaft and on a front side of the driving device.

18. The all-terrain vehicle according to claim 17, wherein the stabilizer bar comprises: a main bar section and branch bar sections, the main bar section being arranged on the frame, the branch bar sections being connected to both sides of the main bar section and extending toward a rear direction, and rear end of each of the branch bar sections being coupled to an upper part of the trailing arm.

* * * * *